(12) United States Patent
Wang et al.

(10) Patent No.: US 12,167,492 B2
(45) Date of Patent: Dec. 10, 2024

(54) TIMER CONTROL METHOD, CONFIGURATION METHOD, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventors: Shukun Wang, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 346 days.

(21) Appl. No.: 17/675,499

(22) Filed: Feb. 18, 2022

(65) Prior Publication Data

US 2022/0174776 A1 Jun. 2, 2022

Related U.S. Application Data

(63) Continuation of application No. PCT/CN2019/122462, filed on Dec. 2, 2019.

(51) Int. Cl.
*H04W 76/27* (2018.01)
*H04W 52/02* (2009.01)
*H04W 72/21* (2023.01)
*H04W 76/12* (2018.01)
*H04W 76/38* (2018.01)

(52) U.S. Cl.
CPC ....... *H04W 76/27* (2018.02); *H04W 52/0229* (2013.01); *H04W 72/21* (2023.01); *H04W 76/12* (2018.02); *H04W 76/38* (2018.02)

(58) Field of Classification Search
CPC . H04W 76/27; H04W 52/0229; H04W 72/21; H04W 76/12; H04W 76/38; H04W 76/15; H04W 24/02; H04L 5/0044; H04L 5/0048; H04L 5/001; H04L 5/0064;
(Continued)

(56) References Cited

U.S. PATENT DOCUMENTS

2019/0208429 A1* 7/2019 Hong .................. H04L 5/001
2020/0244410 A1* 7/2020 Kim .................... H04L 5/0035
(Continued)

FOREIGN PATENT DOCUMENTS

CN 106470436 A 3/2017
CN 109496447 A 3/2019
(Continued)

OTHER PUBLICATIONS

The supplementary European search report dated Mar. 15, 2023 from European patent Application No. 19954821.5.
(Continued)

*Primary Examiner* — Tejis Daya
(74) *Attorney, Agent, or Firm* — Quarles & Brady LLP

(57) ABSTRACT

A method for controlling a behavior of a terminal device includes: when a secondary cell (SCell) accessed by the terminal device enters an active state of a dormant behavior, the terminal device determines an uplink behavior of the terminal device according to a configuration information sent by a network device, and/or when a state of the SCell accessed by the terminal device is the active state of the dormant behavior, the terminal device stops running a timer, starts the timer, or restarts the timer.

17 Claims, 23 Drawing Sheets

(58) Field of Classification Search
CPC ... H04L 5/0032; H04L 5/0078; H04L 5/0098; Y02D 30/70

See application file for complete search history.

(56) References Cited

U.S. PATENT DOCUMENTS

| | | | |
|---|---|---|---|
| 2020/0260311 A1* | 8/2020 | Jung | H04W 24/10 |
| 2020/0314885 A1* | 10/2020 | Cirik | H04L 5/0048 |
| 2021/0167930 A1 | 6/2021 | Jeon et al. | |
| 2021/0203468 A1* | 7/2021 | Yi | H04W 72/0453 |
| 2022/0022067 A1* | 1/2022 | Kim | H04L 5/0098 |

FOREIGN PATENT DOCUMENTS

| | | |
|---|---|---|
| CN | 110011752 A | 7/2019 |
| CN | 110012499 A | 7/2019 |
| CN | 110519853 A | 11/2019 |
| WO | 2015180299 A1 | 12/2015 |
| WO | 2019184630 A1 | 10/2019 |

OTHER PUBLICATIONS

ZTE Corporation et al., "On delay reduction of SCell Activation", 3GPP Draft; R2-1910750 Further Consideration on Fast Scell Activation, 3rd Generation Partnership Project (3GPP), Mobile Competence Centre ; 650, Route Des Lucioles ; F-06921 Sophia-Antipolis Cedex ; vol. RAN WG2, No. Prague, Czech Republic; Aug. 26, 2019-Aug. 30, 2019, Aug. 16, 2019 (Aug. 16, 2019), the whole document.

LG Electronics Inc, "Consideration on dormancy behavior", 3GPP DRAFT; R2-1915181, 3rd Generation Partnership Project (3GPP), Mobile Competence Centre ; 650, Route Des Lucioles ; F-06921 Sophia-Antipolis Cedex ; France, vol. RAN WG2, No. Reno, U.S.A.; Nov. 18, 2019-Nov. 22, 2019, Nov. 8, 2019 (Nov. 8, 2019), the whole document.

Vivo, "UE behaviour for a suspended SCG", 3GPP DRAFT; R2-1914944, 3rd Generation Partnership Project (3GPP), Mobile Competence Centre ; 650, Route Des Lucioles ; F-06921 Sophia-Antipolis Cedex ; France, vol. RAN WG2, No. Reno, Nevada, USA; Nov. 18, 2019-Nov. 22, 2019, Nov. 8, 2019 (Nov. 8, 2019), the whole document.

The First Office Action dated Jan. 19, 2023 from Chinese Application No. 202110887716.8.

ZTE Corporation: "On SCell dormancy behavior", 3GPP TSG-RAN WG2 Meeting #108, R2-1914822, Nov. 8, 2019 (Nov. 8, 2019), the whole document.

Vivo: "The timing of SCell state and RRC configures SCell dormant state", 3GPP TSG-RAN WG2 Meeting#101bis, R2-1804683, Apr. 5, 2018 (Apr. 5, 2018), the whole document.

The Examination Report dated Oct. 24, 2023 from European patent application No. 19954821.5.

International Search Report and the Written Opinion Dated Dec. 2, 2019 From the International Searching Authority Re. Application No. PCTCN2019122462.

3GPP TS 38.331 v16.2.0 (Sep. 2020) 3rd Generation Partnership Project, Technical Specification Group Radio Access Network, NR, Radio Resource Control (RRC) protocol specification (Release 16).

3GPP TS 38.321 v16.2.1 (Sep. 2020) 3rd Generation Partnership Project, Technical Specification Group Radio Access Network, NR, Medium Access Control (MAC) protocol specification (Release 16).

The partial supplementary European search report dated Nov. 10, 2022 from European patent Application No. 19954821.5.

Nokia et al: "Remaining details of New SCell state" SGPP DRAFT; R2-1802755, Feb. 16, 2018 (Feb. 16, 2018), the whole document.

CATT: "SCG Dormant state", 3GPP DRAFT; R2-1905881; May 13, 2019 (May 13, 2019), the whole document.

Ericsson: "DC and CA enhancements", 3GPP Draft; RP-190972; Jun. 2, 2019 (Jun. 2, 2019), the whole document.

The Summons to attend oral proceedings pursuant to Rule 115(1) EPC dated Jul. 29, 2024 from European patent application No. 19954821.5.

* cited by examiner

Two component carriers with discontinuous frequencies are aggregated into 40 MHz bandwidth

| $C_7$ | $C_6$ | $C_5$ | $C_4$ | $C_3$ | $C_2$ | $C_1$ | R | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

| $C_7$ | $C_6$ | $C_5$ | $C_4$ | $C_3$ | $C_2$ | $C_1$ | R | Oct 1 |
|---|---|---|---|---|---|---|---|---|

FIG. 4

S301: When a SCell accessed by the terminal device enters an active state of a dormant behavior, the terminal device determines an uplink behavior of the terminal device according to a configuration information sent by a network device. ⟋ S301

FIG. 8

Terminal device 900

Second processor 901

FIG. 15

Terminal device 2000

Fourth receiver 2001

FIG. 17

Terminal device 3000

Fifth receiver 3001

FIG. 18

Network device 4000

First transmitter 4001

FIG. 19

Network device 5000

Second transmitter 5001

FIG. 20

Network device 6000

Third transmitter 6001

FIG. 21

Network device 7000

Fourth transmitter 7001

FIG. 22

TIMER CONTROL METHOD, CONFIGURATION METHOD, ELECTRONIC DEVICE, AND STORAGE MEDIUM

CROSS REFERENCE

This application is a continuation of an International Application No. PCT/CN2019/122462, entitled "TIMER CONTROL METHOD, CONFIGURATION METHOD, ELECTRONIC DEVICE, AND STORAGE MEDIUM", filed on Dec. 2, 2019, which is incorporated by reference in the present application in its entirety.

TECHNICAL FIELD

The embodiments of the present application relate to the field of wireless communication technology, and more particularly, to a timer control method, a configuration method, an electronic device, and a storage medium.

BACKGROUND

In the related art, how a terminal device (user equipment, UE) controls a timer on a dormant bandwidth part (BWP) or a non-dormant BWP, and how to control the timer when a state of a secondary cell accessed by the terminal device is an active state of a dormant behavior has not yet been clarified.

SUMMARY

In order to solve the above technical problems, embodiments of the present application provide a connection timer control method, a configuration method, an electronic device, and a storage medium, which clarify how to control a timer on a dormant BWP or a non-dormant BWP and how to control the timer when a state of a secondary cell accessed by the terminal device is an active state of a dormant behavior.

In a first aspect, an embodiment of the present application provides a timer control method, comprising: when a terminal device switches to a dormant BWP or a non-dormant BWP, the terminal device starts a first timer, stops the first timer, or restarts the first timer.

In a second aspect, an embodiment of the present application provides a method for controlling an uplink behavior of a terminal device, wherein method comprises:
when a secondary cell (SCell) accessed by the terminal device enters an active state of a dormant behavior, the terminal device determines an uplink behavior of the terminal device according to a configuration information sent by a network device.

In a third aspect, an embodiment of the present application provides a timer control method, wherein method comprises:
when a state of a SCell accessed by a terminal device is an active state of a dormant behavior, the terminal device stops running a second timer, starts the second timer, or restarts the second timer.

In a fourth aspect, an embodiment of the present application provides a secondary cell group configuration method, wherein method comprises:
a terminal device receiving a first configuration information sent by a network device, wherein the first configuration information comprises at least one dormant secondary cell (SCell) group, and the at least one dormant SCell group comprises at least one SCell.

In a fifth aspect, an embodiment of the present application provides a bandwidth part configuration method, wherein method comprises:
a terminal device receiving a second RRC dedicated signaling sent by a network device, wherein the second RRC dedicated signaling comprises at least one first BWP, and each of the at least one first BWP is associated with a first BWP ID.

In a sixth aspect, an embodiment of the present application provides a timer control method, wherein method comprises:
a network device sending a first indication information to a terminal device, wherein the first indication information is used to indicate whether to use a first timer when a state of a SCell accessed by the terminal device is an active state of a dormant behavior or an active state of a non-dormant behavior.

In a seventh aspect, an embodiment of the present application provides a timer control method, wherein method comprises:
a network device sending a first indication information to a terminal device, wherein the first indication information is used to indicate whether to use a second timer when a state of a SCell is an active state of a dormant behavior.

In an eighth aspect, an embodiment of the present application provides a secondary cell group configuration method, wherein method comprises:
a network device sending a first configuration information to a terminal device, wherein the first configuration information comprises at least one dormant SCell group, and the at least one dormant SCell group comprises at least one SCell.

In a ninth aspect, an embodiment of the present application provides a bandwidth part configuration method, wherein method comprises:
a network device sending a second RRC dedicated signaling to a terminal device, wherein the second RRC dedicated signaling comprises at least one first BWP, and each of the at least one first BWP is associated with a first BWP ID.

In a tenth aspect, an embodiment of the present application provides a ninth aspect, and an embodiment of the present application provides a terminal device, wherein the terminal device comprises:
a first processor, wherein when the terminal device switches to a dormant BWP or a non-dormant BWP, the first processor starts a first timer, stops the first timer, or restarts the first timer.

In an eleventh aspect, an embodiment of the present application provides a terminal device, wherein the terminal device comprises:
a second processor, wherein when a secondary cell (SCell) accessed by the terminal device enters an active state of a dormant behavior, the terminal device determines an uplink behavior of the terminal device according to a configuration information sent by a network device.

In a twelfth aspect, an embodiment of the present application provides a terminal device, wherein the terminal device comprises:
a third processor, wherein when a state of a secondary cell (SCell) accessed by a terminal device is an active state of a dormant behavior, the terminal device stops running a second timer, starts the second timer, or restarts the second timer.

In a thirteenth aspect, an embodiment of the present application provides a terminal device, wherein the terminal device comprises:

a fourth receiver configured to receive a first configuration information sent by a network device, wherein the first configuration information comprises at least one dormant SCell group, and the at least one dormant SCell group comprises at least one SCell.

In a fourteenth aspect, an embodiment of the present application provides a terminal device, wherein the terminal device comprises:

a fifth receiver configured to receive a second RRC dedicated signaling sent by a network device, wherein the second RRC dedicated signaling comprises at least one first bandwidth part (BWP), and each of the at least one first BWP is associated with a first BWP ID.

In a fifteenth aspect, an embodiment of the present application provides a network device, wherein the network device comprises:

a first transmitter configured to send a first indication information to a terminal device, wherein the first indication information is used to indicate whether to use a first timer when a state of a SCell accessed by the terminal device is an active state of a dormant behavior or an active state of a non-dormant behavior.

In a sixteenth aspect, an embodiment of the present application provides a network device, wherein the network device comprises:

a second transmitter configured to send a first indication information to a terminal device, wherein the first indication information is used to indicate whether to use a second timer when a state of a SCell is an active state of a dormant behavior.

In a seventeenth aspect, an embodiment of the present application provides a network device, wherein the network device comprises:

a third transmitter configured to send a first configuration information to a terminal device, wherein the first configuration information comprises at least one dormant SCell group, and the at least one dormant SCell group comprises at least one SCell.

In an eighteenth aspect, an embodiment of the present application provides a network device, wherein the network device comprises:

a fourth transmitter configured to send a second RRC dedicated signaling to a terminal device, wherein the second RRC dedicated signaling comprises at least one first BWP, and each of the at least one first BWP is associated with a first BWP ID.

In a nineteenth aspect, an embodiment of the present application provides a terminal device comprising a processor and a memory configured to store a computer program executable on the processor, wherein the processor is configured to, when running the computer program, perform steps of the timer control method, the method for controlling the uplink behavior of the terminal device, the secondary cell group configuration method, or the bandwidth part configuration method performed by the aforesaid terminal device.

In a twentieth aspect, an embodiment of the present application provides a network device comprising a processor and a memory configured to store a computer program executable on the processor, wherein the processor is configured to, when running the computer program, perform steps of the timer control method, the secondary cell group configuration method, or the bandwidth part configuration method performed by the aforesaid network device.

In a twenty-first aspect, an embodiment of the present application provides a chip comprising a processor for calling and running a computer program from a memory, so that a device installed with the chip performs the timer control method, the method for controlling the uplink behavior of the terminal device, the secondary cell group configuration method, or the bandwidth part configuration method performed by the aforesaid terminal device.

In a twenty-second aspect, an embodiment of the present application provides a chip comprising a processor for calling and running a computer program from a memory, so that a device installed with the chip performs the timer control method, the secondary cell group configuration method, or the bandwidth part configuration method performed by the aforesaid network device.

In a twenty-third aspect, an embodiment of the present application provides a storage medium storing an executable program, the executable program, when executed by a processor, implements the timer control method, the method for controlling the uplink behavior of the terminal device, wherein the secondary cell group configuration method, or the bandwidth part configuration method performed by the aforesaid terminal device.

In a twenty-fourth aspect, an embodiment of the present application provides a storage medium storing an executable program, wherein the executable program, when executed by a processor, implements the timer control method, the secondary cell group configuration method, or the bandwidth part configuration method performed by the aforesaid network device.

In a twenty-fifth aspect, an embodiment of the present application provides a computer program product comprising a computer program instruction, wherein the computer program instruction causes a computer to perform the timer control method, the method for controlling the uplink behavior of the terminal device, the secondary cell group configuration method, or the bandwidth part configuration method performed by the aforesaid terminal device.

In a twenty-sixth aspect, an embodiment of the present application provides a computer program product comprising a computer program instruction, wherein the computer program instruction causes a computer to perform the timer control method, the secondary cell group configuration method, or the bandwidth part configuration method performed by the aforesaid network device.

In a twenty-seventh aspect, an embodiment of the present application provides a computer program, wherein the computer program causes a computer to perform the timer control method, the method for controlling the uplink behavior of the terminal device, the secondary cell group configuration method, or the bandwidth part configuration method performed by the aforesaid terminal device.

In a twenty-eighth aspect, an embodiment of the present application provides a computer program, wherein the computer program causes a computer to perform the timer control method, the secondary cell group configuration method, or the bandwidth part configuration method performed by the aforesaid network device.

Embodiments of the present application provide a chip used to perform the above data retransmission method.

In details, the chip comprises a processor for calling and running a computer program from a memory, so that a device installed with the chip performs the above data retransmission method.

A timer control method, an electronic device, and a storage medium provided by embodiments of the present application comprises: when a terminal device switches to a dormant BWP or a non-dormant BWP, the terminal device starts a first timer, stops the first timer, or restarts the first timer. In this way, it is clarified how to control a timer on the dormant BWP or the non-dormant BWP. The timer control method further comprises: when a state of a secondary cell (SCell) accessed by the terminal device is an active state of a dormant behavior, the terminal device stops running a second timer, starts the second timer, or restarts the second timer. In this way, it is clarified how to control the timer when the state of the secondary cell accessed by the terminal device is the active state of the dormant behavior.

BRIEF DESCRIPTION OF THE DRAWINGS

FIG. 1-2 is a schematic diagram 2 of a bandwidth allocation in the present application.

FIG. 1-3 is a schematic diagram 3 of a bandwidth allocation in the present application.

FIG. 2 is a schematic diagram of a carrier aggregation of the present application.

FIG. 3 is a schematic diagram of another carrier aggregation of the present application.

FIG. 4 is a schematic diagram of a MAC CE of the present application.

FIG. 8 is a schematic diagram of an optional processing flow of a method for controlling an uplink behavior of a terminal device according to an embodiment of the present application.

FIG. 15 is a schematic diagram 2 of a composition structure of a terminal device according to an embodiment of the present application.

FIG. 17 is a schematic diagram 4 of a composition structure of a terminal device according to an embodiment of the present application.

FIG. 18 is a schematic diagram 5 of a composition structure of a terminal device according to an embodiment of the present application.

FIG. 19 is a schematic diagram 1 of a composition structure of a network device according to an embodiment of the present application.

FIG. 20 is a schematic diagram 2 of a composition structure of a network device according to an embodiment of the present application.

FIG. 21 is a schematic diagram 3 of a composition structure of a network device according to an embodiment of the present application.

FIG. 22 is a schematic diagram 4 of a composition structure of a network device according to an embodiment of the present application.

DETAILED DESCRIPTION OF ILLUSTRATED EMBODIMENTS

In order for more comprehensive understanding of features and technical solutions of implementations, the following will describe in detail implementations with reference to the accompanying drawings. The accompanying drawings are merely intended for illustration rather than limitation on the embodiments of the present application.

Before describing a method of connection reestablishment in implementations in detail, the related art will be described briefly.

Currently, with the pursuit of speed, delay, high-speed mobility, energy efficiency, and the diversity and complexity of services in the future life, 3rd generation partnership project (3GPP) international standards organization starts to research and develop the 5th generation (5-Generation, 5G). Primary application scenarios of the 5G include enhance mobile broadband (eMBB), ultra reliable low latency communications (URLLC), and massive machine type communication (mMTC).

The demand for eMBB is growing rapidly with the goal of providing users with multimedia content, services and data. On the other hand, since eMBB may be deployed in different scenarios, such as indoor, urban, rural, and the like, the capabilities and demands vary greatly, therefore, it cannot be unconditionally determined and must be analyzed in detail in the context of specific deployment scenarios. Typical applications of URLLC include: industrial automation, power automation, remote medical operation (surgery), traffic safety and security, and the like. Typical features of mMTC include: high connection density, small data volume, delay-insensitive services, low cost and long lifetime of the module, and the like.

Figure 1:
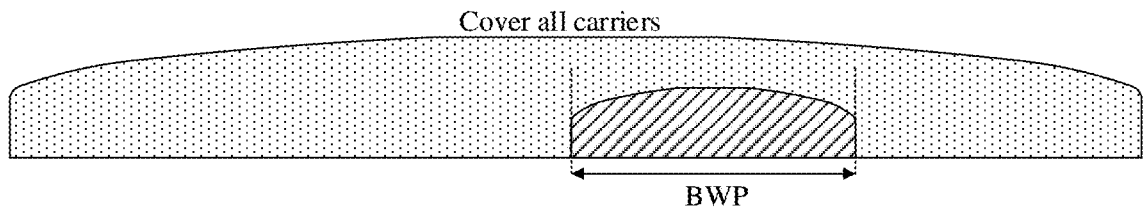
FIG. 1-1 is a schematic diagram 1 of a bandwidth allocation in the present application.
Figures 1, 2:
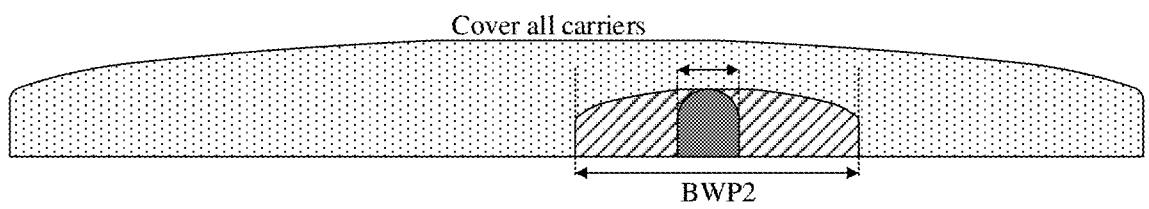
Figures 1, 2, 3:
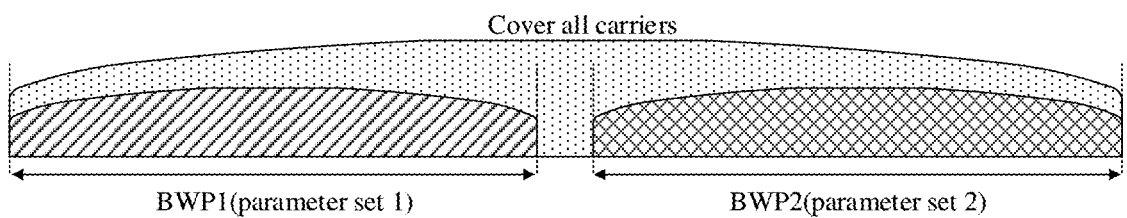
Figure 2:
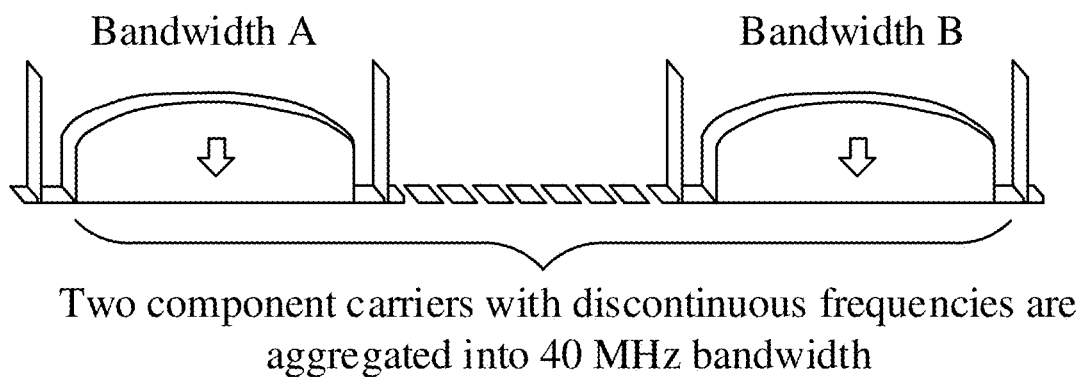
Figure 3:
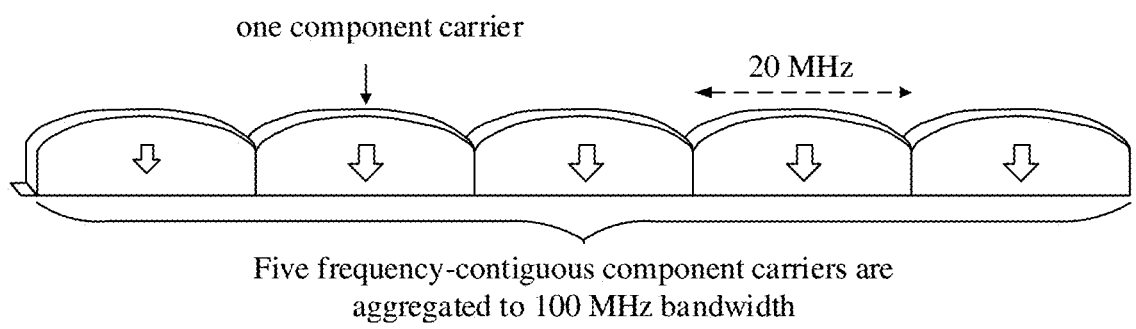

During early deployment of new radio (NR), it would be difficult to acquire complete NR coverage. Therefore, typically, a network coverage mode of wide-area coverage with a long-term evolution (LTE) system and island coverage with an NR system is employed. Moreover, because LTE is generally deployed below 6 GHz, there is little spectrum below 6 GHz that can be used for the 5G mobile communication technology. Therefore, the application of the spectrum above 6 GHz must be studied for NR. However, the coverage of the high-frequency band is limited, and signals fade quickly in the high-frequency band. In order to protect the early LTE system investment of a mobile operator, an operation mode between LTE and NR is proposed, called tight interworking In the NR system, a maximum channel bandwidth (wideband carrier) can be 400 MHz, which is much larger than a maximum bandwidth of 20 MHz in the LTE system. If the terminal equipment keeps working on the wideband carrier, the power consumption of the terminal device is very large. Therefore, it is recommended that a radio frequency (RF) bandwidth of the terminal device can be adjusted according to an actual throughput of the terminal device. In order to optimize the power consumption of the terminal device, BWP is introduced. If a rate requirement of the terminal device is very low, a small bandwidth can be configured for the terminal device, as illustrated in FIG. 1-1, a bandwidth allocation diagram 1. If the rate requirement of the terminal device is high, a slightly larger bandwidth f can be configured for the terminal device, as illustrated in FIG. 1-2, a bandwidth allocation diagram 2. If the terminal device supports a high rate or works in a carrier aggregation (CA) mode, multiple BWPs can be configured for the terminal device, as illustrated in FIG. 1-3, a bandwidth allocation diagram 3. BWP can also trigger a coexistence of multiple numerologies in a cell.

Currently, a terminal device can be configured with up to 4 uplink BWPs and 4 downlink BWPs through dedicated signaling for radio resource control (RRC), but only one uplink BWP and one downlink BWP can be activated at the same time. The RRC dedicated signaling may also indicate the first activated BWP among the BWPs configured for the terminal device. Configuration parameters for each BWP can include:
1) Subcarrier spacing (subcarrierSpacing).
2) Cyclic prefix (cyclicPrefix).
3) A first physical resource block (PRB) of the BWP and a number of consecutive PRBs (locationAndBandwidth).
4) BWP identifier (ID) (bwp-Id).
5) BWP common configuration parameters and dedicated configuration parameters (bwp-Common, bwp-Dedicated).

When a carrier is deactivated and then activated through a media access control (MAC) control element (CE), the initial first activated BWP is the BWP corresponding to the first activated BWP ID in the RRC signaling.

The BWP ID is 0 to 4 in the RRC signaling, and 0 is the initial BWP by default.

In a downlink control information (DCI), a BWP indicator is 2 bit. If the number of configured BWPs is less than or equal to 3, the BWP indicator=1, 2, and 3 correspond to BWP ID=1, 2, and 3 respectively. If the number of BWPs is 4, the BWP indicator=0, 1, 2, and 3 correspond to the BWPs configured according to the sequential index respectively. In addition, a network side uses consecutive BWP IDs when configuring BWPs, as illustrated in the following table.

| | Value of BWP indicator field |
|---|---|
| 2 bits | Bandwidth part |
| 00 | First bandwidth part configured by higher layers |
| 01 | Second bandwidth part configured by higher layers |
| 10 | Third bandwidth part configured by higher layers |
| 11 | Fourth bandwidth part configured by higher layers |

Carrier aggregation (CA) technology can meet high-speed requirements of the terminal device. A schematic diagram of a carrier aggregation is illustrated in FIG. 2. Another schematic diagram of a carrier aggregation is illustrated in FIG. 3. CA enables the NR system to support a larger bandwidth by jointly scheduling and using resources on multiple component carriers (CCs), thereby enabling a higher system peak rate. According to continuity of the aggregated carriers on the spectrum, there can be continuous carrier aggregation and non-continuous carrier aggregation. According to whether the bands where the aggregated carriers are located are the same, there can be intra-band carrier aggregation and inter-band carrier aggregation.

In the CA, there is one and only one primary component carrier (PCC), and the PCC provides RRC signaling connection, non-access stratum (NAS) function, security function, etc. The physical uplink control channel (PUCCH) exists on the PCC and only on the PCC. A secondary component carrier (SCC) also exists on the aggregated carriers, and the SCC only provides additional radio resources. The PCC and the SCC are collectively known as serving cells. The standard also specifies that the aggregated carriers support a maximum of 5 carries, that is, the maximum bandwidth after aggregation is 100 MHZ, and the aggregated carriers belong to the same network device. All aggregated carriers use the same cell-radio network temporary identifier (C-RNTI), and the network device ensures that the C-RNTI does not conflict in the cells where each of the carriers is located. Because both asymmetric carrier aggregation and symmetric carrier aggregation are supported, it is required that the aggregated carriers must have downlink but may not have uplink. For the PCC cell, there must be physical downlink control channel (PDCCH) and PUCCH of the current cell, and only the primary carrier cell has the PUCCH, and other secondary carrier cells may have the PDCCH.

The SCell is configured through RRC dedicated signaling, and the initial configured state is an inactive state in which data transmission and reception cannot be performed. Then, the data transmission and reception can only be performed if the SCell is activated through the MAC CE. A schematic diagram of the MAC CE is illustrated in FIG. 4. From the perspective of SCell configuration and activation delay, such architecture is not an optimal architecture. The delay caused by the state transition reduces the efficiency of CA usage and radio resources, especially in small cell deployment scenarios. In a dense small cell deployment scenario, the signaling load of each SCell is also very large, especially when each SCell needs to be configured separately. Therefore, the current CA architecture introduces additional delay, which restricts the use of CA and reduces the gain of CA load sharing.

To this end, LTE R15 optimizes the CA, and the functions that are mainly optimized are as follows.

Figure 5:
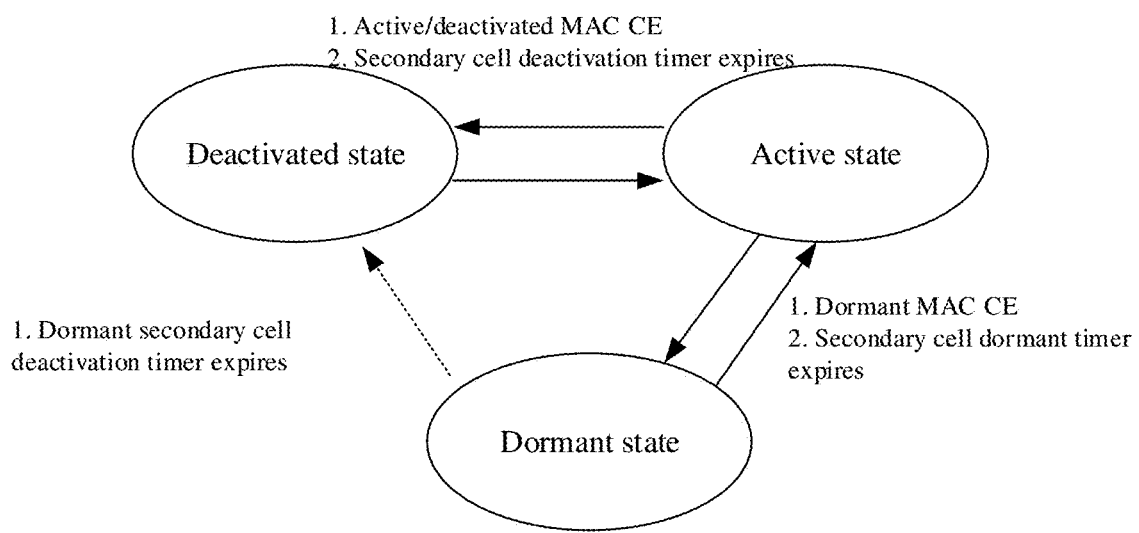
FIG. 5 is a schematic diagram of a state transition of a SCell of the present application.

Dormant SCell state: States of the SCell include an active state and an inactive state, and in order to realize fast cell recovery, a new cell state is defined, i.e., a dormant state. In the dormant state, the terminal device measures and reports CQI/RRM, but does not decode PDCCH. Further, a new MAC CE is defined to control the transition of the dormant state, that is, the transition between the active state and the dormant state. A setting of 1 identifies the dormant state, and 0 indicates the active state. A schematic diagram of state transition of SCell in LTE is illustrated in FIG. 5. The activated state and the deactivated state can be converted to each other, the activated state and the dormant state can be converted to each other, the dormant state can be converted to the deactivated state, and the deactivated state cannot be converted to the dormant state.

Currently, there is no dormant state of the SCell in NR. In order to realize rapid recovery of the SCell and transmit data as soon as possible, a mechanism similar to the dormant state needs to be introduced. However, the mechanism of the dormant SCell in LTE system is too complicated and the MAC CE needs to be introduced to perform the state transition of the SCell. To this end, it is considerable to configure a concept called a dormant BWP for SCell. When the traffic is not large, the BWPs of some of the SCells can be switched to the dormant BWPs through the DCI method. When the traffic is large, the dormant BWP of the SCell is switched to the non-dormant BWP through the DCI to activate the service transmission function of the cell, which has a shorter activation delay and lower complexity compared with the traditional dormant state of the SCell.

The current standard allows RRC to directly configure the state of the SCell as an activated state and also stipulates that the dormant behavior is a part of the activated SCell state. Therefore, in the current standard, the SCell state is only configured to be the active state through RRC signaling, and it is not clear whether it is the activated SCell state of the dormant behavior or the activated SCell state of the non-dormant behavior.

Further, the standard agrees that the terminal device can reside on the dormant BWP to realize the dormant behavior, but the standard does not stipulate which BWP the UE will send/receive data on after the terminal device changes from the dormant behavior to the non-dormant activate state.

The technical solutions of embodiments of the present application can be applied to various communication systems, such as a global system of mobile communication (GSM) system, a code division multiple access (CDMA) system, a wideband code division multiple access (WCDMA) system, general packet radio service (GPRS), a long term evolution (LTE) system, an LTE frequency division duplex (FDD) system, an LTE time division duplex (TDD) system, an advanced long term evolution (LTE-A) system, a new radio (NR) system, an advanced system of a NR system, an LTE-based access to unlicensed spectrum (LTE-U) system, a NR-based access to unlicensed spectrum (NR-U) system, a universal mobile telecommunication system (UMTS), a worldwide interoperability for microwave access (WiMAX) communication system, wireless local area networks (WLAN), wireless fidelity (WiFi), a next generation communication system or other communication systems, etc.

In general, a limited number of connections are supported by traditional communication systems and are easy to implement. However, with the development of communication technology, mobile communication systems will not only support traditional communication, but should also support, for example, device to device (D2D) communication, machine to machine (M2M) communication, machine type communication (MTC), and vehicle to vehicle (V2V) communication, etc. Embodiments of the present application can also be applied to these communication systems.

System architectures and service scenarios described in the embodiments of the present application are intended to describe the technical solutions in the embodiments of present application more clearly, but are not intended to limit the technical solutions provided in the embodiments of present application. Those of ordinary skill in the art may learn that, as a network architecture evolves and a new service scenario emerges, the technical solutions provided in the embodiments of present application are also applicable to a similar technical problem.

The network device involved in embodiments of the present application may be a common base station (such as an NodeB or an eNB or a gNB), a new radio controller (NR controller), a centralized unit, a new radio base station, a remote radio module, a micro base station, a relay, a distributed unit, a transmission reception point (TRP), a transmission point (TP) or any other devices. The specific technology and the specific device configuration adopted by the network device may not be limited in the present application. For ease of description, in all embodiments of the present application, the above-mentioned apparatuses providing wireless communication function for the terminal device may collectively referred to as the network device.

In embodiments of the present application, terminal devices may be terminals of any kind. For example, the terminal device may be a user equipment of machine type communication. In other words, the terminal device may also be referred to as a user equipment (UE), a mobile station (MS), a mobile terminal, a terminal etc. The terminal device may communicate with one or more core networks via a radio access network (RAN). For example, the terminal device may be a mobile phone (also known as a "cellular" phone), a computer with a mobile terminal etc. For example, the terminal device may also be a portable, a pocket-sized, a handheld, a computer built-in or a vehicle on board mobile apparatus, which may exchange language and/or data with the wireless access network. The terminal device may not be specifically limited in embodiments of the present application.

Optionally, the network device and the terminal device may be deployed on land, whether indoor or outdoor, handheld or vehicle on board. The network device and the terminal device may also be deployed on water surface, and may also be deployed on airborne aircraft, balloons and satellites. The application scenarios of the network device and the terminal device may not be limited in embodiments of the present application.

Optionally, a communication between the network device and the terminal device and a communication between the terminal devices may be carried out through a licensed spectrum, or through an unlicensed spectrum or through both of them. The communication between the network device and the terminal device may be conducted in the spectrum below 7 gigahertz (GHz), in the spectrum above 7 GHz, or in both of them. The specific spectrum resource adopted by the communication between the network device and the terminal device may not be limited in embodiments of the present application.

Generally, traditional communication systems may support a limited number of connections and may be easy to be implemented. However, with development of the communication technology, mobile telecommunication systems will not only support traditional communications, but will also support, for example, a device to device (D2D) communication, a machine to machine (M2M) communication, a machine type communication (MTC) and a vehicle to vehicle (V2V) communication, etc., to which embodiments of the present application may also be applied.

Figure 6:
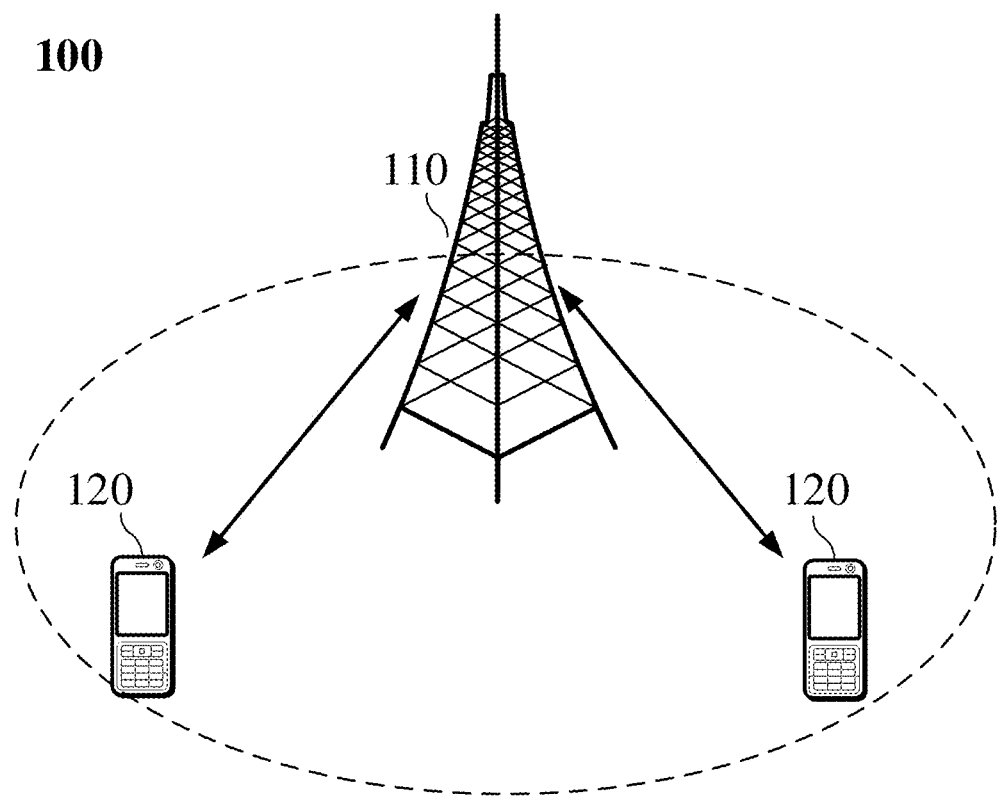
FIG. 6 is a schematic diagram of a composition structure of a communication system according to an embodiment of the present application.

An exemplary communication system 100 applied in embodiments of the present application is illustrated in FIG. 6. The communication system 100 may include a network device 110. The network device 110 may be a device communicating with a terminal device 120 (or referred to as a communication terminal or a terminal). The network device 110 may provide a communication coverage for a specific geographic area, and may communicate with terminal devices located in the coverage area. In some embodiments, the network device 110 may be a base transceiver station (BTS) of a GSM system or a CDMA system, or a base station (NodeB, NB) of a WCDMA system, or an evolutional base station (Evolutional Node B, eNB or eNodeB) of an LTE system, or a wireless controller of a cloud radio access network (CRAN). Or the network device may be a mobile switching center, a relay station, an access point, a vehicle on board device, a wearable device, a hub, a switch, a bridge, a router, a network side device of a 5G network, or a network device of a future evolutional public land mobile network (PLMN), etc.

The communication system 100 may also include at least one terminal device 120 located in the coverage area of the network device 110. As used herein, "terminal device" may include, but be not limited to: a connection via a wired line, such as via a public switched telephone networks (PSTN), a digital subscriber line (DSL), a digital cable, and a direct cable connection; and/or another data connection/network; and/or via a wireless interface, for example, in a case of a cellular network, a wireless local area networks (WLAN), a digital TV network such as a DVB-H network, a satellite network, an AM-FM broadcast transmitter; and/or an apparatus of another terminal device that is configured to receive/transmit communication signals; and/or an internet of things (IoT) device. A terminal device configured to communicate via a wireless interface may be referred to as a "wireless communication terminal", a "wireless terminal" or a "mobile terminal". Examples of the mobile terminal may include but be not limited to: a satellite or cellular phone; a personal communications system (PCS) terminal that combines a cellular radio phone with data processing, fax and data communication capability; a PDA that may include a radio phone, a pager, an Internet/Intranet access, a web browser, a memo pad, a calendar and/or a global positioning system (GPS) receiver; and a conventional laptop and/or palmtop receiver or other electrical apparatuses including a radio telephone transceiver. The terminal device may refer to an access terminal, a user equipment (UE), a user unit, a user station, a mobile station, a mobile platform, a remote station, a remote terminal, a mobile device, a user terminal, a terminal, a wireless communication device, a user agent or a user apparatus. The access terminal may be a cellular phone, a cordless phone, a session initiation protocol (SIP) phone, a wireless local loop (WLL) station, a personal digital assistant (PDA), and a handheld device with wireless communication function, a computing device or other processing devices connecting to wireless modems, a vehicle on board device, a wearable device, a terminal device in a 5G network, or a terminal device in the future evolutional PLMN, etc.

In some embodiments, a Device to Device (D2D) communication may be performed between terminal devices 120.

In some embodiments, the 5G system or the 5G network may also be referred to as a new radio (NR) system or a NR network.

FIG. 6 illustrates a network device and two terminal devices as an example. In some embodiments, the communication system 100 may include multiple network devices and the coverage area of each network device may include different numbers of terminal devices, which is not limited in embodiments of the present application.

Optionally, the communication system 100 may also include other network entities, such as a network controller, a mobile management entity, which are not limited in embodiments of the present application.

It should be appreciated that, devices with communication functions in the network/system in embodiments of the present application may be referred to as communication devices. Taking the communication system 100 illustrated in FIG. 6 as an example. The communication device may include a network device 110 and a terminal device 120 with communication functions. The network device 110 and the terminal device 120 may be specific devices described above, which will not be repeated here again. The communication device may also include other devices in the communication system 100, for example, other network entities such as a network controller or a mobile management entity, which is not limited in embodiments of the present application.

Figure 7:
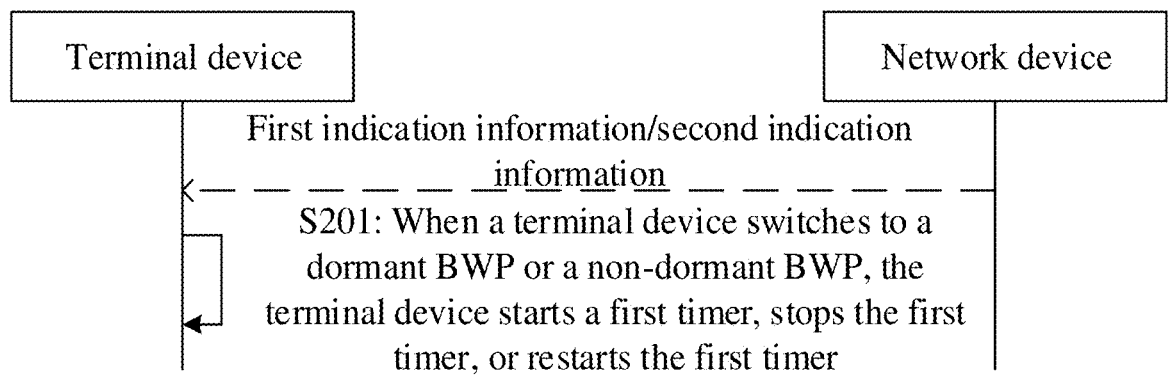
FIG. 7 is a schematic diagram of an optional processing flow of a timer control method according to an embodiment of the present application.

An optional processing flow of a timer control method provided by an embodiment of the present application, as illustrated in FIG. 7, includes the following steps:

Step S201: When a terminal device switches to a dormant BWP or a non-dormant BWP, the terminal device starts a first timer, stops the first timer, or restarts the first timer.

In some embodiments, the first timer is used for switching the BWP state, for example, the first timer is used for switching from a dormant BWP to a non-dormant BWP, or the first timer is used for switching from a non-dormant BWP to a dormant BWP.

In the following, separate descriptions are given separately for the case where the terminal device enters the dormant BWP and the terminal device enters the non-dormant BWP.

In some embodiments, when the terminal device enters a non-dormant BWP, the method may further include: the terminal device receiving a first indication information sent by a network device, wherein the first indication information is used to indicate whether the terminal device switches to the non-dormant BWP. If the first indication information indicates the terminal device to switch to the non-dormant BWP, the terminal device enters the non-dormant BWP.

In some embodiments, the first indication information is further used to indicate whether to use the first timer on the non-dormant BWP. In the case that the terminal device has entered a non-dormant BWP according to the first indication information, if the first indication information indicates that the first timer is used on the non-dormant BWP, the terminal device starts the first timer, or the terminal device restarts the first timer. When the first timer expires, the terminal device switches to the dormant BWP; or the terminal device switches from the non-dormant BWP to the dormant BWP according to the first indication information sent by the network device; or the terminal device switches from the non-dormant BWP to a default BWP according to the first indication information sent by the network device.

In some embodiments, if the terminal device has started the first timer, in the case that the terminal device performs data transmission, the first timer is restarted. The data transmission comprises at least one of the followings: the terminal device receiving a schedule sent by a network device, the terminal device sending data, and the terminal device receiving data.

In some embodiments, in the case that the terminal device has entered a non-dormant BWP according to the first indication information, if the first indication information indicates that the first timer is not used on the non-dormant BWP, the terminal device prohibits starting the first timer, or the terminal device stops the running first timer.

In an embodiment of the present invention, for a scenario where the terminal device has entered an inactive BWP according to the first indication information, the first timer may be a BWP inactivity timer (bwp-InactivityTimer), and the first timer may also be a timer for controlling the transition of the state of a SCell from the active state of the non-dormant behavior to the active state of the dormant behavior.

In some embodiments, the first indication information may be carried in an RRC dedicated signaling.

In some embodiments, in the case of the terminal device entering the dormant BWP, the method may further include: the terminal device receiving a second indication information sent by the network device, wherein the second indication information is used to indicate whether the terminal device is switch to the non-dormant BWP. If the second indication information indicates the terminal device to switch to the non-dormant BWP, the terminal device enters the non-dormant BWP.

In some embodiments, the second indication information is further used to indicate whether to use the first timer on the dormant BWP. In the case that the terminal device has entered the dormant BWP according to the second indication information, if the second indication information indicates that the first timer is to be used on the dormant BWP, the terminal device starts the first timer, or the terminal device restarts the first timer. When the first timer expires, the terminal device switches to a first BWP. The first BWP may be the first activated BWP configured by the network device, or the non-dormant BWP configured by the network device, or the BWP of the latest service; the first activated BWP may be the first activated BWP configured by the network device.

In some embodiments, in the case that the terminal device has entered the dormant BWP according to the first indication information, if the second indication information indicates that the first timer is not used on the dormant BWP, the terminal device prohibits starting the first timer, or the terminal device stops the running first timer.

In an embodiment of the present invention, for a scenario in which the terminal device has entered the dormant BWP according to the second indication information, the first timer may be a timer for controlling the transition of the state of the SCell from the active state of dormant behavior to the active state of non-dormant behavior.

In some embodiments, the second indication information may be carried in an RRC dedicated signaling.

An embodiment of the present application provides an optional processing flow of a method for controlling an uplink behavior of a terminal device, as illustrated in FIG. 8, including the following steps:

Step S301: When a SCell accessed by the terminal device enters an active state of a dormant behavior, the terminal device determines an uplink behavior of the terminal device according to a configuration information sent by a network device.

In some embodiments, if the configuration information does not include the dormant uplink BWP, the terminal device switches to the currently activated uplink BWP; or the terminal device switches to the first uplink activated BWP configured by the network device; or the terminal device switches to the uplink initial BWP; or the terminal device switches to the BWP with the smallest BWP ID; or the terminal device switches to the BWP with the largest BWP ID.

For example, if the configuration information includes dormant downlink BWP and does not include dormant uplink BWP. The terminal device enters the dormant BWP according to the indication information sent by the network device, and the terminal device enters the dormant downlink BWP on the SCell. The terminal device enters the currently activated uplink BWP in the uplink direction, or the terminal device enters the first uplink activated BWP configured by the network device in the uplink direction, or the terminal device enters the uplink initial BWP in the uplink direction, or the terminal device enters the BWP with the smallest BWP ID in the uplink direction, or the terminal device enters the BWP with the largest BWP ID in the uplink direction. The configuration information may be carried in RRC dedicated signaling.

In some embodiments, the terminal device is prohibited from sending data and/or uplink signals on the uplink BWP regardless of which BWP the terminal device enters in the uplink direction. The data may include: an uplink shared channel (physical uplink shared channel, PUSCH); the uplink signal may include: a sounding reference signal (SRS).

Figure 9:
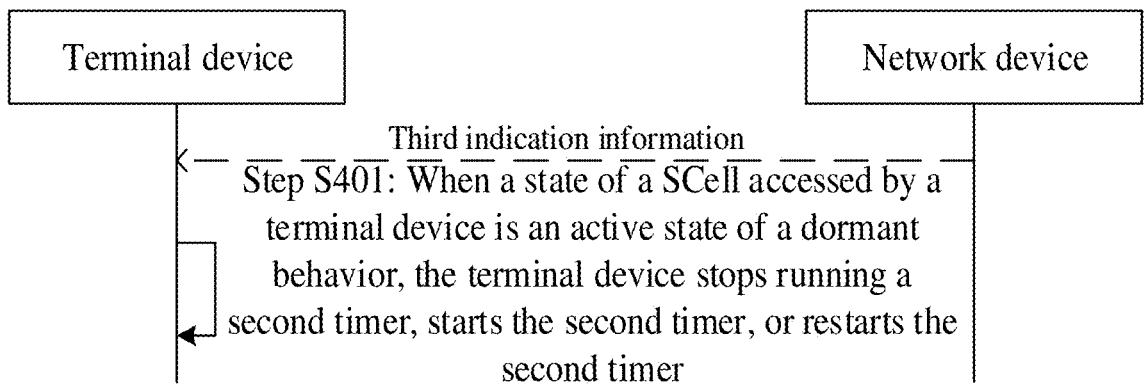
FIG. 9 is a schematic diagram of another optional processing flow of a timer control method according to an embodiment of the present application.

Another optional processing flow of a timer control method provided by the embodiment of the present application, as illustrated in FIG. 9, includes the following steps:

Step S401: When a state of a SCell accessed by a terminal device is an active state of a dormant behavior, the terminal device stops running a second timer, starts the second timer, or restarts the second timer.

In some embodiments, when the state of the SCell accessed by the terminal device is the active state of the dormant behavior, the terminal device switches to the dormant BWP.

In some embodiments, the method further includes: the terminal device receiving a third indication information sent by the network device.

The third indication information is used to indicate whether the SCell accessed by the terminal device enters the active state of dormancy behavior, and/or whether the second timer is used when the state of the SCell is the active state of dormant behavior.

In some embodiments, in the case where the second timer is not used when the third indication information indicates that the state of the SCell is the active state of the dormant behavior, the terminal device stops running the second timer, and the terminal device is prohibited from starting the second timer.

In some embodiments, the second timer is used when the third indication information indicates that the state of the SCell is the active state of the dormant behavior, if the terminal device enters the dormant BWP according to the third indication information, and the state of the SCell is the active state of the dormant behavior, the terminal device starts the second timer, or continues to run the second timer, or restarts the second timer. If the second timer expires, the SCell enters a deactivated state.

In some embodiments, the second timer is a SCell deactivation timer, or the second timer is a timer used to control the transition of the state of the SCell from the active state of the dormant behavior to the deactivated state.

In an embodiment of the present application, the third indication information may be carried in an RRC dedicated signaling.

Figure 10:
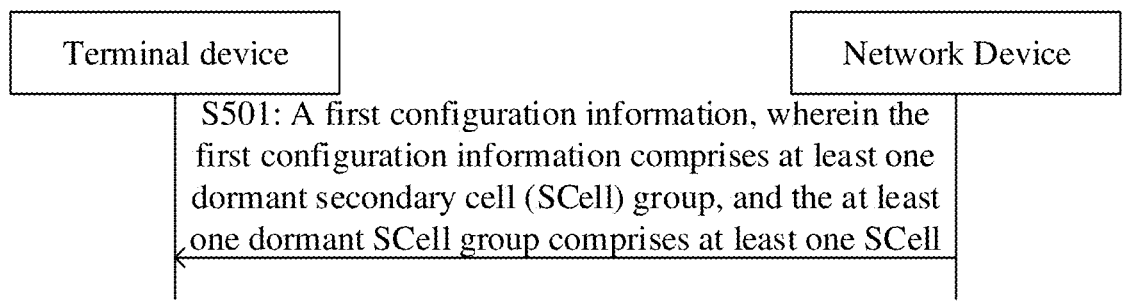
FIG. 10 is a schematic diagram of an optional processing flow of a secondary cell group configuration method according to an embodiment of the present application.

An optional processing flow of a secondary cell group configuration method provided by the embodiment of the present application, as illustrated in FIG. 10, includes the following steps:

S501: A terminal device receiving a first configuration information sent by a network device, wherein the first configuration information comprises at least one dormant secondary cell (SCell) group, and the at least one dormant SCell group comprises at least one SCell.

In some embodiments, each of the dormant SCell groups is associated with a group that represents a group ID. The at least one dormant SCell group constitutes a dormant SCell group set, and the dormant SCell group set is associated with a group set ID. In each of the dormant SCell group sets, there is no identical dormant SCell among the dormant SCell groups.

In some embodiments, each SCell is associated with at least one dormant SCell group set ID; and/or each SCell is associated with at least one group ID.

Figure 11:
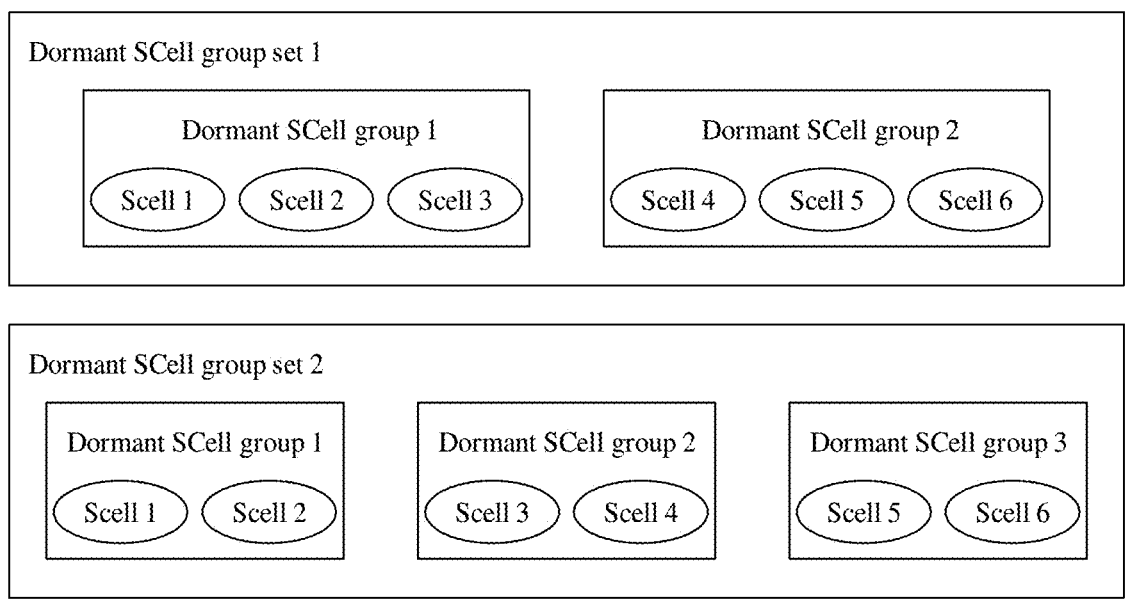
FIG. 11 is a schematic diagram of allocation of a secondary cell group according to an embodiment of the present application.

In some embodiments, a schematic diagram of allocation of secondary cell groups, as illustrated in FIG. 11, all the dormant SCell groups belong to a dormant SCell group set; or all the dormant SCell groups have a same group assignment. One dormant SCell in one dormant SCell group set may belong to two or more dormant SCell groups.

Figure 12:
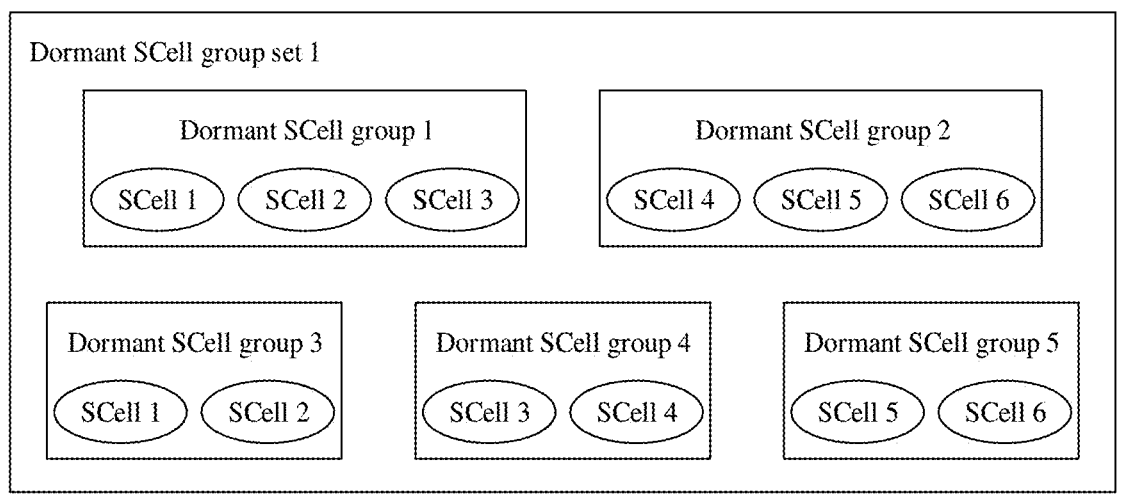
FIG. 12 is a schematic diagram of another allocation of a secondary cell group according to an embodiment of the present application.

In some embodiments, another schematic diagram of allocation of secondary cell groups, as illustrated in FIG. 12, each of the dormant SCell groups belongs to one in at least one dormant SCell group set; or each of the dormant SCell groups has at least one group assignment. It can be understood that, there are two or more group assignments for dormant SCell groups for dormant SCells, and a dormant SCell group set has one group assignment for dormant SCell group.

In some embodiments, the first configuration information is carried in an RRC dedicated signaling, for example, the first configuration information is carried in a first RRC dedicated signaling.

Based on the secondary cell group configuration method provided by an embodiment of the present application, the related protocol can be described as:

```
AC-CellGroupConfig ::=            SEQUENCE {
    drx-Config                                        SetupRelease { DRX-Config }
OPTIONAL,     -- Need M
    schedulingRequestConfig                           SchedulingRequestConfig
OPTIONAL,     -- Need M
    bsr-Config                                        BSR-Config
OPTIONAL,     -- Need M
    tag-Config                                        TAG-Config
OPTIONAL,     -- Need M
    phr-Config                                        SetupRelease { PHR-Config }
OPTIONAL,     -- Need M
    skipUplinkTxDynamic        BOOLEAN,
    ...,
    [[
        csi-Mask                                                        BOOLEAN
OPTIONAL,     -- Need M
        dataInactivityTimer                           SetupRelease { DataInactivityTimer }
OPTIONAL    -- Cond MCG-Only
    ]]
    [[dormancyScellGroupConfig1           DormancyScellGroupConfig    OPTIONAL,
-- Need M]]
    [[dormancyScellGroupConfig2           DormancyScellGroupConfig    OPTIONAL,
-- Need M]]
    [[dormancyScellGroupConfig            DormancyScellGroupConfig    OPTIONAL,
-- Need M]]
}
DataInactivityTimer ::=    ENUMERATED {s1, s2, s3, s5, s7, s10, s15, s20, s40, s50,
s60, s80, s100, s120, s150, s180}
DormancyScellGroupConfig ::=    SEQUENCE {
dormancyScellGroup-ToReleaseList                                SEQUENCE (SIZE
(1..maxNrofscellGroup))           OF                            DormancyScellGroupId
OPTIONAL
dormancyScellGroup-ToAddList                                    SEQUENCE (SIZE
(1..maxNrofscellGroup))           OF                            DormancyScellGroup
OPTIONAL
}
DormancyScellGroup ::=        SEQUENCE {
DormancyScellGroupId          INTEGER (0.. maxNrofscellGroup -1)
scellForDCI                   SCellIndex 或者 ServCellIndex       OPTIONAL
}
```

Figure 13:
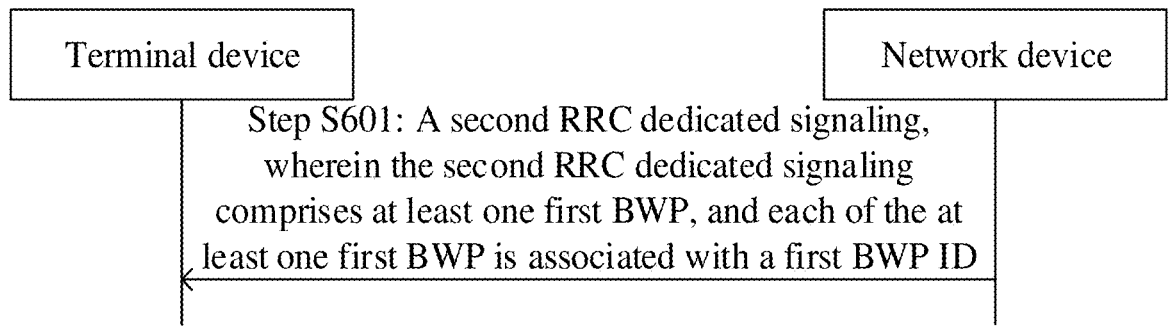
FIG. 13 is a schematic diagram of an optional processing flow of a bandwidth part configuration method according to an embodiment of the present application.

An optional processing flow of a bandwidth part configuration method provided by an embodiment of the present application, as illustrated in FIG. 13, includes the following steps:

Step S601: A terminal device receiving a second RRC dedicated signaling sent by a network device, wherein the second RRC dedicated signaling comprises at least one first BWP, and each of the at least one first BWP is associated with a first BWP ID.

In some embodiments, the second RRC dedicated signaling further comprises a dormant BWP. The second RRC dedicated signaling further comprises a dormant BWP ID. The dormant BWP ID is associated with one first BWP ID and is used to indicate the dormant BWP in the at least one first BWP.

In some embodiments, an indication of the dormant BWP in the at least one first BWP is configured in a serving cell configuration IE of each cell in a cell group configuration in an RRC reconfiguration message.

In some embodiments, a configuration of each first BWP carries one second indication information, and the second indication information is used to indicate whether a corresponding second BWP is the dormant BWP.

In some embodiments, a first parameter of the dormant BWP is configured by default, and the first parameter configured by default is used to indicate the dormant BWP. The first parameter comprises: a downlink control channel (physical downlink control channel, PDCCH) configuration parameter, and/or a downlink shared channel (physical downlink control channel, PDSCH) configuration parameter.

For example, the second RRC dedicated signaling includes 5 BWPs, one of which has a default PDCCH configuration parameter, and the BWP of the default PDCCH configuration parameter is the dormant BWP.

In some embodiments, the second RRC dedicated signaling comprises one dormant BWP, the dormant BWP has no corresponding dormant BWP ID, and/or a second parameter of the dormant BWP is configured by default, the second parameter configured by default is used to indicate the dormant BWP. The second parameter comprises: a PDCCH configuration parameter, and/or a PDSCH configuration parameter.

Based on the bandwidth part configuration method provided by an embodiment of the present application, the related protocol can be described as:

```
ServingCellConfig ::=                           SEQUENCE {
   tdd-UL-DL-ConfigurationDedicated                         TDD-UL-DL-ConfigDedicated
OPTIONAL, -- Cond TDD
   initialDownlinkBWP                                       BWP-DownlinkDedicated
OPTIONAL, -- Need M
   downlinkBWP-ToReleaseList                                SEQUENCE (SIZE (1..maxNrofBWPs)) OF
BWP-Id                    OPTIONAL,      -- Need N
   downlinkBWP-ToAddModList                                 SEQUENCE (SIZE (1..maxNrofBWPs))
OF BWP-Downlink           OPTIONAL,      -- Need N
   firstActiveDownlinkBWP-Id                                                       BWP-Id
OPTIONAL,  -- Cond SyncAndCellAdd
   bwp-InactivityTimer                          ENUMERATED {ms2, ms3, ms4, ms5, ms6,
ms8, ms10, ms20, ms30,
                                                                      ms40,ms50,        ms 60,
ms80,ms100, ms200,ms300, ms500,
                                                                    ms750,  ms1280,   ms1920,
ms2560, spare10, spare9, spare8,
                                                                       spare7,  spare6,   spare5,
spare4, spare3, spare2, spare1 } OPTIONAL,    --Need R
   defaultDownlinkBWP-Id                                                           BWP-Id
OPTIONAL,     -- Need S
   uplinkConfig                                                                    UplinkConfig
OPTIONAL,      -- Need M
   supplementaryUplink                                                             UplinkConfig
OPTIONAL,      -- Need M
   pdcch-ServingCellConfig                      SetupRelease { PDCCH-ServingCellConfig }
OPTIONAL,      -- Need M
   pdsch-ServingCellConfig                      SetupRelease { PDSCH-ServingCellConfig }
OPTIONAL,      -- Need M
   csi-MeasConfig                               SetupRelease { CSI-MeasConfig }
OPTIONAL,      -- Need M
   sCellDeactivationTimer                       ENUMERATED {ms20, ms40, ms80, ms160,
ms200, ms240,
                                                                       ms320,   ms400,   ms480,
ms520, ms640, ms720,
                                                                       ms840,     ms1280,
   spare2,spare1 }         OPTIONAL,     -- Cond ServingCellWithoutPUCCH
   crossCarrierSchedulingConfig                             CrossCarrierSchedulingConfig
OPTIONAL,     -- Need M
   tag-Id                                       TAG-Id,
   dummy                                                    ENUMERATED {enabled}
OPTIONAL,      -- Need R
   pathlossReferenceLinking                     ENUMERATED {spCell, sCell}
OPTIONAL,     -- Cond SCellOnly
   servingCellMO                                                                   MeasObjectId
OPTIONAL,     -- Cond MeasObject
   ...,
   [[
   lte-CRS-ToMatchAround                                                           SetupRelease
{ RateMatchPatternLTE-CRS }                                  OPTIONAL,     --
Need M
```

-continued

```
  rateMatchPatternToAddModList                                    SEQUENCE  (SIZE
(1..maxNrofRateMatchPatterns)) OF RateMatchPattern                OPTIONAL,    -- Need N
  rateMatchPatternToReleaseList                                   SEQUENCE  (SIZE
(1..maxNrofRateMatchPatterns)) OF RateMatchPatternId              OPTIONAL,    -- Need N
  downlinkChannelBW-PerSCS-List                SEQUENCE   (SIZE   (1..maxSCSs))  OF
SCS-SpecificCarrier                          OPTIONAL     -- Need S
]]
[[
DormancyScellGroupIdlist=            SEQUENCE     (SIZE      (1..maxNrofscellGroup))  OF
DormancyScellGroupId;
DormancyScellGroupBelongs            SEQUENCE  (SIZE  (1..maxNrofRateMatchPatterns))  OF
DormancyScellGroupBelong                        OPTIONAL,       -- Need N
DormancyScellGroupBelong::=                     SEQUENCE {
DormancyScellGroupId= DormancyScellGroupId;
DormancyScellGroupSet= ENUMERATED (firstGroupset, secondGroupset ' both)
}
]]
}
```

Figure 14:
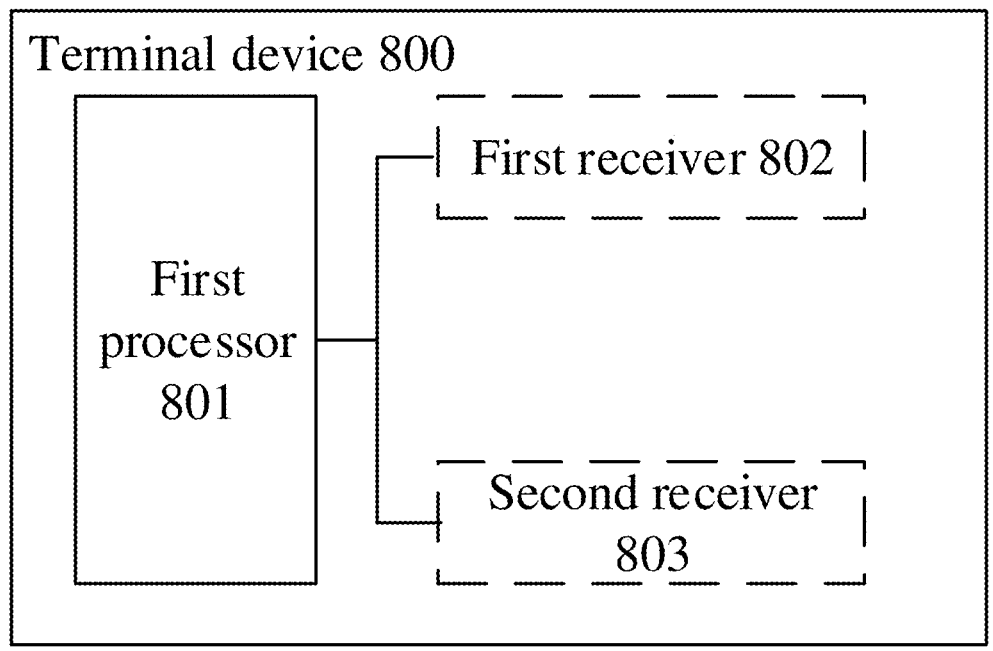
FIG. 14 is a schematic diagram 1 of a composition structure of a terminal device according to an embodiment of the present application.

An embodiment of the present application further provides a terminal device. A composition structure diagram 1 of the terminal device is illustrated in FIG. 14. A terminal device 800 includes:

a first processor 801, wherein when the terminal device switches to a dormant BWP or a non-dormant BWP, the first processor starts a first timer, stops the first timer, or restarts the first timer.

In some embodiments, when the terminal device performs data transmission and has already run the first timer, the first processor 801 restarts the first timer.

In some embodiments, the data transmission comprises at least one of the followings: receiving a schedule sent by a network device; sending data; and receiving data.

In some embodiments, when the first timer expires, the first processor 801 switches from the non-dormant BWP to the dormant BWP or the first processor 801 switches from the dormant BWP to the non-dormant BWP.

In some embodiments, when the first timer expires, the first processor 801 switches from the non-dormant BWP to the dormant BWP, or from the non-dormant BWP to a default BWP, according to a first indication information sent by a network device.

In some embodiments, the terminal device further comprises: a first receiver 802 configured to receive a first indication information sent by a network device;

wherein the first indication information is used to indicate whether the terminal device switches to the dormant BWP or the non-dormant BWP, and/or the first indication information is used to indicate whether to use the first timer on the non-dormant BWP.

In some embodiments, when the first timer expires, the first processor 801 switches from the dormant BWP to a first BWP.

In some embodiments, the first BWP is a first activated BWP configured by a network device, or the non-dormant BWP configured by the network device, or a BWP of a latest service.

In some embodiments, the terminal device further comprises:

a second receiver 803 configured to receive a second indication information sent by a network device, where the second indication information is used to indicate whether the terminal device switches to the non-dormant BWP, and/or the second indication information is used to indicate whether to use the first timer on the dormant BWP.

In some embodiments, the first timer is a BWP inactivity timer, or the first timer is a timer used to control a transition of a state of a SCell from an active state of a non-dormant behavior to an active state of a dormant behavior, or the first timer is a timer used to control a transition of a state of the SCell from the active state of the dormant behavior to the active state of the non-dormant behavior.

An embodiment of the present application further provides a terminal device. A composition structure diagram 2 of the terminal device is illustrated in FIG. 15. A terminal device 900 includes:

a second processor 901, wherein when a SCell accessed by the terminal device enters an active state of a dormant behavior, the terminal device determines an uplink behavior of the terminal device according to a configuration information sent by a network device.

In some embodiments, the configuration information does not comprise a dormant uplink BWP, and the terminal device remains in a currently activated uplink BWP; or the terminal device switches to a first uplink activated BWP configured by the network device; or the terminal device switches to an uplink initial BWP; or the terminal device switches to a BWP with a smallest BWP identifier (ID); or the terminal device switches to a BWP with a largest BWP ID.

In some embodiments, the second processor 901 is configured to prohibit a transmission of data and/or an uplink signal on an uplink BWP; and/or the second processor 901 is configured to suspend or clear a configured authorized resource.

In some embodiments, the data comprises an uplink shared channel (PUSCH); and/or the uplink signal comprises an SRS.

Figure 16:
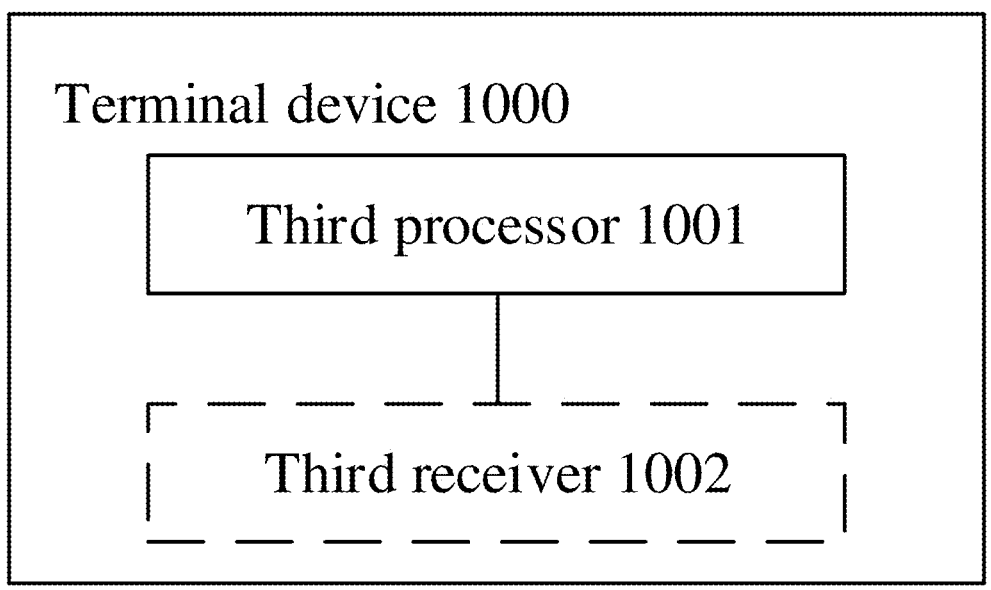
FIG. 16 is a schematic diagram 3 of a composition structure of a terminal device according to an embodiment of the present application.

An embodiment of the present application further provides a terminal device. A composition structure diagram 3 of the terminal device is illustrated in FIG. 16. A terminal device 1000 includes:

a third processor 1001, wherein when a state of a SCell accessed by a terminal device is an active state of a dormant behavior, the terminal device stops running a second timer, starts the second timer, or restarts the second timer.

In some embodiments, the third processor 1001 is configured to switch to a dormant BWP.

In some embodiments, the terminal device 1000 further comprises: a third receiver 1002 configured to receive a third indication information sent by a network device; wherein the third indication information is used to indicate whether the SCell accessed by the terminal device enters the active state of the dormant behavior, and/or whether to use the second timer when the state of the SCell is the active state of the dormant behavior.

In some embodiments, the third indication information indicates that the second timer is not used when the state of the SCell is the active state of the dormant behavior, the third processor 1001 stops running the second timer.

In some embodiments, the third indication information indicates that the second timer is used when the state of the SCell is the active state of the dormant behavior, the third processor 1001 starts the second timer, continues to run the second timer, or restarts the second timer.

In some embodiments, when the second timer expires, the SCell enters a deactivated state.

In some embodiments, the second timer is an SCell deactivation timer, or the second timer is a timer used to control a transition of the state of the SCell from the active state of the dormant behavior to a deactivated state.

An embodiment of the present application further provides a terminal device. A composition structure diagram 4 of the terminal device is illustrated in FIG. 17. A terminal device 2000 includes:
- a fourth receiver 2001 configured to receive a first configuration information sent by a network device, wherein the first configuration information comprises at least one dormant SCell group, and the at least one dormant SCell group comprises at least one SCell.

In some embodiments, all the dormant SCell groups belong to a dormant SCell group set; or all the dormant SCell groups have a same group assignment.

In some embodiments, each of the dormant SCell groups belongs to one in at least one dormant SCell group set; or each of the dormant SCell groups has at least one group assignment.

In some embodiments, each of the dormant SCell groups is associated with a group that represents a group ID.

In some embodiments, the at least one dormant SCell group constitutes a dormant SCell group set, and the dormant SCell group set is associated with a group set ID.

In some embodiments, in each of the dormant SCell group sets, there is no identical dormant SCell among the dormant SCell groups.

In some embodiments, each SCell is associated with at least one dormant SCell group set ID; and/or each SCell is associated with at least one group ID.

In some embodiments, the first configuration information is carried in a first RRC dedicated signaling.

An embodiment of the present application further provides a terminal device. A composition structure diagram 5 of the terminal device is illustrated in FIG. 18. A terminal device 3000 includes:
- a fifth receiver 3001 configured to receive a second RRC dedicated signaling sent by a network device, wherein the second RRC dedicated signaling comprises at least one first BWP, and each of the at least one first BWP is associated with a first BWP identifier (ID).

In some embodiments, the second RRC dedicated signaling further comprises a dormant BWP.

In some embodiments, the second RRC dedicated signaling further comprises a dormant BWP ID.

In some embodiments, the dormant BWP ID is associated with one first BWP ID and is used to indicate the dormant BWP in the at least one first BWP.

In some embodiments, an indication of the dormant BWP in the at least one first BWP is configured in a serving cell configuration IE of each cell in a cell group configuration in an RRC reconfiguration message.

In some embodiments, a configuration of each first BWP carries one second indication information, and the second indication information is used to indicate whether a corresponding second BWP is the dormant BWP.

In some embodiments, a first parameter of the dormant BWP is configured by default, and the first parameter configured by default is used to indicate the dormant BWP.

In some embodiments, the first parameter comprises: a PDCCH configuration parameter, and/or a PDSCH configuration parameter.

In some embodiments, the second RRC dedicated signaling further comprises one dormant BWP; the dormant BWP has no corresponding dormant BWP ID, and/or a second parameter of the dormant BWP is configured by default, the second parameter configured by default is used to indicate the dormant BWP.

In some embodiments, the second parameter comprises: a PDCCH configuration parameter, and/or a PDSCH configuration parameter.

An embodiment of the present application further provides a network device. A composition structure diagram 1 of the network device is illustrated in FIG. 19. A terminal device 4000 includes:
- a first transmitter 4001 configured to send a first indication information to a terminal device, wherein the first indication information is used to indicate whether to use a first timer when a state of a SCell accessed by the terminal device is an active state of a dormant behavior or an active state of a non-dormant behavior.

In some embodiments, the first indication information is further used to indicate the terminal device to switch from a non-dormant BWP to a dormant BWP, or to switch from the non-dormant BWP to a default BWP.

In some embodiments, the first timer is a BWP inactivity timer, or the first timer is a timer used to control a transition of the state of the SCell from the active state of the non-dormant behavior to the dormant behavior.

In some embodiments, the first indication information is further used to indicate whether the terminal device switches to a dormant BWP or a non-dormant BWP; and/or the first indication information is used to indicate whether to use the first timer on the non-dormant BWP or the dormant BWP.

An embodiment of the present application further provides a network device. A composition structure diagram 2 of the network device is illustrated in FIG. 20. A terminal device 5000 includes:
- a second transmitter 5001 configured to send a first indication information to a terminal device, wherein the first indication information is used to indicate whether to use a second timer when a state of a SCell is an active state of a dormant behavior.

In some embodiments, the first indication information is further used to indicate whether the SCell accessed by the terminal device enters the active state of the dormant behavior.

An embodiment of the present application further provides a network device. A composition structure diagram 3 of the network device is illustrated in FIG. 21. A terminal device 6000 includes:
- a third transmitter 6001 configured to send a first configuration information to a terminal device, wherein the first configuration information comprises at least one dormant SCell group, and the at least one dormant SCell group comprises at least one SCell.

In some embodiments, all the dormant SCell groups belong to a dormant SCell group set; or all the dormant SCell groups have a same group assignment.

In some embodiments, each of the dormant SCell groups belongs to one in at least one dormant SCell group set; or each of the dormant SCell groups has at least one group assignment.

In some embodiments, each of the dormant SCell groups is associated with a group that represents a group ID.

In some embodiments, the at least one dormant SCell group constitutes a dormant SCell group set, and the dormant SCell group set is associated with a group set ID.

In some embodiments, in each of the dormant SCell group sets, there is no identical dormant SCell among the dormant SCell groups.

In some embodiments, each SCell is associated with at least one dormant SCell group set ID; and/or each SCell is associated with at least one group ID.

In some embodiments, the first configuration information is carried in a first RRC dedicated signaling.

An embodiment of the present application further provides a network device. A composition structure diagram 4 of the network device is illustrated in FIG. 22. A terminal device 7000 includes:
  a fourth transmitter 7001 configured to send a second RRC dedicated signaling to a terminal device, wherein the second RRC dedicated signaling comprises at least one first BWP, and each of the at least one first BWP is associated with a first BWP identifier (ID).

In some embodiments, the second RRC dedicated signaling further comprises a dormant BWP.

In some embodiments, the second RRC dedicated signaling further comprises a dormant BWP ID.

In some embodiments, the dormant BWP ID is associated with one first BWP ID and is used to indicate the dormant BWP in the at least one first BWP.

In some embodiments, an indication of the dormant BWP in the at least one first BWP is configured in a serving cell configuration IE of each cell in a cell group configuration in an RRC reconfiguration message.

In some embodiments, a configuration of each first BWP carries one second indication information, and the second indication information is used to indicate whether a corresponding second BWP is the dormant BWP.

In some embodiments, a first parameter of the dormant BWP is configured by default, and the first parameter configured by default is used to indicate the dormant BWP.

In some embodiments, the first parameter comprises: a PDCCH configuration parameter, and/or a PDSCH configuration parameter.

In some embodiments, the second RRC dedicated signaling further comprises one dormant BWP; the dormant BWP has no corresponding dormant BWP ID, and/or a second parameter of the dormant BWP is configured by default, the second parameter configured by default is used to indicate the dormant BWP.

In some embodiments, the second parameter comprises: a PDCCH configuration parameter, and/or a PDSCH configuration parameter.

An embodiment of the present application further provides a terminal device comprising a processor and a memory configured to store a computer program executable on the processor, wherein the processor is configured to, when running the computer program, perform steps of the timer control method, the method for controlling the uplink behavior of the terminal device, the secondary cell group configuration method, or the bandwidth part configuration method performed by the aforesaid terminal device.

An embodiment of the present application further provides a network device comprising a processor and a memory configured to store a computer program executable on the processor, wherein the processor is configured to, when running the computer program, perform steps of the timer control method, the secondary cell group configuration method, or the bandwidth part configuration method performed by the aforesaid network device.

An embodiment of the present application further provides a chip comprising a processor for calling and running a computer program from a memory, so that a device installed with the chip performs the timer control method, the method for controlling the uplink behavior of the terminal device, the secondary cell group configuration method, or the bandwidth part configuration method performed by the aforesaid terminal device.

An embodiment of the present application further provides a chip comprising a processor for calling and running a computer program from a memory, so that a device installed with the chip performs the timer control method, the secondary cell group configuration method, or the bandwidth part configuration method performed by the aforesaid network device.

An embodiment of the present application further provides a storage medium storing an executable program, the executable program, when executed by a processor, implements the timer control method, the method for controlling the uplink behavior of the terminal device, wherein the secondary cell group configuration method, or the bandwidth part configuration method performed by the aforesaid terminal device.

An embodiment of the present application further provides a storage medium storing an executable program, wherein the executable program, when executed by a processor, implements the timer control method, the secondary cell group configuration method, or the bandwidth part configuration method performed by the aforesaid network device.

An embodiment of the present application further provides a computer program product comprising a computer program instruction, wherein the computer program instruction causes a computer to perform the timer control method, the method for controlling the uplink behavior of the terminal device, the secondary cell group configuration method, or the bandwidth part configuration method performed by the aforesaid terminal device.

An embodiment of the present application further provides a computer program product comprising a computer program instruction, wherein the computer program instruction causes a computer to perform the timer control method, the secondary cell group configuration method, or the bandwidth part configuration method performed by the aforesaid network device.

An embodiment of the present application further provides a computer program, wherein the computer program causes a computer to perform the timer control method, the method for controlling the uplink behavior of the terminal device, the secondary cell group configuration method, or the bandwidth part configuration method performed by the aforesaid terminal device.

An embodiment of the present application further provides a computer program, wherein the computer program causes a computer to perform the timer control method, the secondary cell group configuration method, or the bandwidth part configuration method performed by the aforesaid network device.

Figure 23:
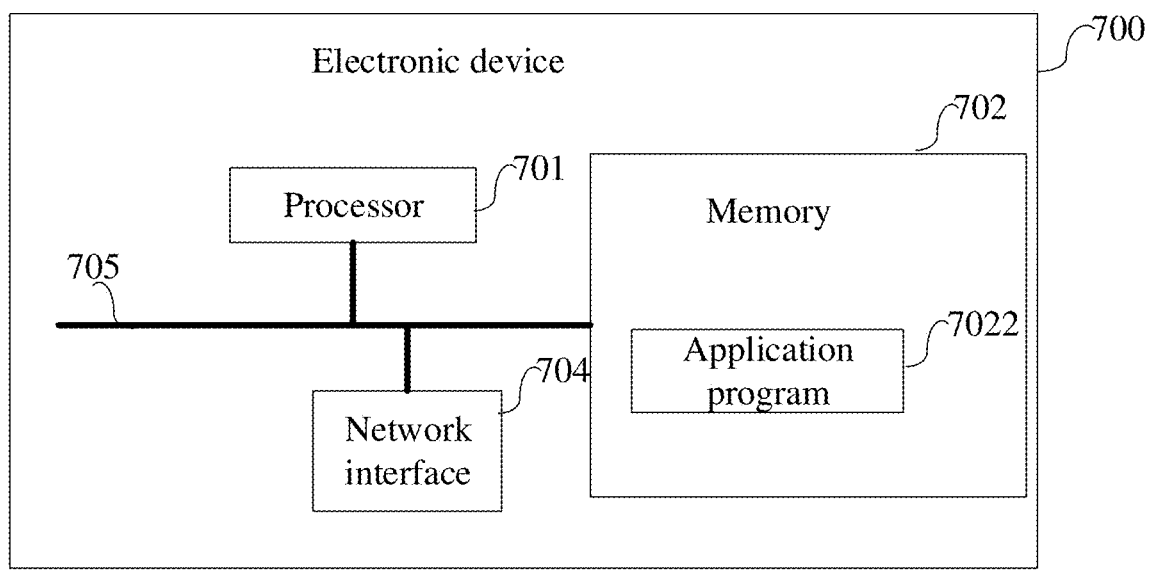
FIG. 23 is a schematic structural diagram of a hardware composition of an electronic device according to an embodiment of the present application.

FIG. 23 is a hardware composition structure diagram of an electronic device (UE or a network device) according to an embodiment of the present application. The electronic device 700 includes at least one processor 701, a memory 702 and at least one network interface 704. Each component in the electronic device 700 is coupled together through a bus system 705. It can be understood that the bus system 705 is used to implement connection communication between these components. The bus system 705 includes a data bus and further includes a power bus, a control bus and a state signal bus. However, for clear description, various buses in FIG. 23 are marked as the bus system 705.

It can be understood that the memory 702 may be a volatile memory or a nonvolatile memory, and may also include both of the volatile and nonvolatile memories. The nonvolatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disc or a compact disc read-only memory (CD-ROM). The magnetic surface memory may be a disk memory or a tape memory. The volatile memory may be a random access memory (RAM), and is used as an external high-speed cache. It is exemplarily but unlimitedly described that RAMs in various forms may be adopted, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a syncLink dynamic random access memory (SLDRAM) and a direct rambus random access memory (DRRAM). The memory 702 described in the embodiment of the present application is intended to include, but not limited to, memories of these and any other proper types.

In the embodiment of the present application, the memory 702 is configured to store various types of data to support the operation of the electronic device 700. Examples of the data include any computer program, for example, an application program 7022, operated in the electronic device 700. A program for implementing the method in the embodiments of the present application may be included in the application program 7022.

The method disclosed in the embodiments of the present application may be applied to the processor 701 or implemented by the processor 701. The processor 701 may be an integrated circuit chip with a signal processing capability. In an implementation process, each step of the method may be completed by an integrated logic circuit in a hardware form in the processor 701 or an instruction in a software form. The processor 701 may be a universal processor, a digital signal processor (DSP) or another programmable logic device (PLD), a discrete gate or transistor logic device, a discrete hardware component and the like. The processor 701 may be configured to implement or execute each method, step and logical block diagram disclosed in the embodiments of the present application. The universal processor may be a microprocessor, any conventional processor or the like. The steps of the method disclosed in combination with the embodiments of the present application may be directly embodied to be executed and completed by a hardware decoding processor or executed and completed by a combination of software modules and the hardware in the decoding processor. The software module may be located in a storage medium, and the storage medium is located in the memory 702. The processor 701 reads information in the memory 702 and completes the steps of the method in combination with the hardware thereof.

In an exemplary embodiment, the electronic device 700 may be implemented by one or more application specific integrated circuits (ASICs), DSPs, PLDs, complex programmable logic devices (CPLDs), field programmable gate arrays (FPGAs), universal processors, controllers, micro controller units (MCUs), microprocessor units (MPUs) or other electronic components, and is configured to execute the abovementioned method.

The embodiments of the present application also provide a storage medium, which is configured to store a computer program.

Optionally, the storage medium may be applied to UE in the embodiments of the present application, and the computer program enables a computer to execute corresponding flows in each method in the embodiments of the present application. For simplicity, elaborations are omitted herein.

The present application is described with reference to flowcharts and/or block diagrams of the method, device (system) and computer program product according to the embodiments of the present application. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that a device for implementing a function specified in one flow or multiple flows in the flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including instruction means may be generated by the instructions stored in the computer-readable memory. The instruction means is used to implement the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for implementing the function specified in one flow or multiple flows in the flowcharts and/or one block or multiple blocks in the block diagrams are provided by the instructions executed on the computer or the other programmable data processing device.

It should be understood that the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

Described above are merely preferred embodiments of the present application and not intended to limit the scope of protection of the present application. Any modifications, equivalent replacements, improvements and the like made within the spirit and principle of the present application shall fall within the scope of protection of the present application.

What is claimed is:

1. A method for controlling a behavior of a terminal device, comprising:
   when a secondary cell (SCell) accessed by the terminal device enters an active state of a dormant behavior, the terminal device determines an uplink behavior of the terminal device according to a configuration information sent by a network device,
   wherein the configuration information is sent by the network device via a radio resource control (RRC) dedicated signaling, the RRC dedicated signaling comprises at least one first bandwidth part (BWP), and each of the at least one first BWP is associated with a first BWP identifier (ID),
   wherein the RRC dedicated signaling further comprises a dormant BWP ID,
   wherein the dormant BWP ID is associated with one first BWP ID and is used to indicate a dormant BWP in the at least one first BWP,
   wherein an indication of the dormant BWP in the at least one first BWP is configured in a serving cell configuration IE of each cell in a cell group configuration in an RRC reconfiguration message.

2. The method according to claim 1, wherein the configuration information does not comprise a dormant uplink bandwidth part (BWP), and the terminal device remains in a currently activated uplink BWP; or
   the terminal device switches to a first uplink activated BWP configured by the network device; or
   the terminal device switches to an uplink initial BWP; or
   the terminal device switches to a BWP with a smallest BWP identifier (ID); or
   the terminal device switches to a BWP with a largest BWP ID.

3. The method according to claim 1, wherein the method further comprises:
   the terminal device prohibiting a transmission of data and/or an uplink signal on an uplink BWP; and/or
   the terminal device suspending or clearing a configured authorized resource.

4. The method according to claim 3, wherein:
   the data comprises an uplink shared channel (PUSCH); and/or
   the uplink signal comprises a sounding reference signal (SRS).

5. The method according to claim 1, wherein the terminal device switches to the dormant BWP.

6. A bandwidth part configuration method, comprising:
   a terminal device receiving a radio resource control (RRC) dedicated signaling sent by a network device, wherein the RRC dedicated signaling comprises at least one first bandwidth part (BWP), and each of the at least one first BWP is associated with a first BWP identifier (ID),
   wherein the RRC dedicated signaling further comprises a dormant BWP ID,
   wherein the dormant BWP ID is associated with one first BWP ID and is used to indicate a dormant BWP in the at least one first BWP,
   wherein an indication of the dormant BWP in the at least one first BWP is configured in a serving cell configuration IE of each cell in a cell group configuration in an RRC reconfiguration message.

7. The method according to claim 6, wherein the RRC dedicated signaling further comprises the dormant BWP.

8. A terminal device, comprising:
   a processor, wherein when a secondary cell (SCell) accessed by the terminal device enters an active state of a dormant behavior, the processor determines an uplink behavior of the terminal device according to a configuration information sent by a network device,
   wherein the configuration information is sent by the network device via a radio resource control (RRC) dedicated signaling, the RRC dedicated signaling comprises at least one first bandwidth part (BWP), and each of the at least one first BWP is associated with a first BWP identifier (ID),
   wherein the RRC dedicated signaling further comprises a dormant BWP ID,
   wherein the dormant BWP ID is associated with one first BWP ID and is used to indicate a dormant BWP in the at least one first BWP,
   wherein an indication of the dormant BWP in the at least one first BWP is configured in a serving cell configuration IE of each cell in a cell group configuration in an RRC reconfiguration message.

9. The terminal device according to claim 8, wherein the configuration information does not comprise a dormant uplink bandwidth part (BWP), and the processor remains in a currently activated uplink BWP; or
   the processor switches to a first uplink activated BWP configured by the network device; or
   the processor switches to an uplink initial BWP; or
   the processor switches to a BWP with a smallest BWP identifier (ID); or
   the processor switches to a BWP with a largest BWP ID.

10. The terminal device according to claim 8, wherein the processor is configured to prohibit a transmission of data and/or an uplink signal on an uplink BWP; and/or
    the processor is configured to suspend or clear a configured authorized resource.

11. The terminal device according to claim 10, wherein:
    the data comprises an uplink shared channel (PUSCH); and/or
    the uplink signal comprises a sounding reference signal (SRS).

12. The terminal device according to claim 8, further comprising:
    a receiver configured to receive the configuration information sent by the network device, wherein the configuration information comprises at least one dormant SCell group, and the at least one dormant SCell group comprises at least one SCell.

13. The terminal device according to claim 12, wherein all the dormant SCell groups belong to a dormant SCell group set; or
    all the dormant SCell groups have a same group assignment.

14. The terminal device according to claim 12, wherein each of the dormant SCell groups belongs to one in at least one dormant SCell group set; or
    each of the dormant SCell groups has at least one group assignment.

15. The terminal device according to claim 12, wherein each of the dormant SCell groups is associated with a group that represents a group ID.

16. The terminal device according to claim 12, wherein the at least one dormant SCell group constitutes a dormant SCell group set, and the dormant SCell group set is associated with a group set ID.

17. The terminal device according to claim 16, wherein in each of the dormant SCell group sets, there is no identical dormant SCell among the dormant SCell groups.

* * * * *